United States Patent [19]
Kitamura

[11] Patent Number: 5,287,949
[45] Date of Patent: Feb. 22, 1994

[54] SHAFT LOCKING DEVICE

[75] Inventor: Yoshiharu Kitamura, Nagano, Japan

[73] Assignee: NHK Spring Co., Ltd., Kanagawa, Japan

[21] Appl. No.: 827,487

[22] Filed: Jan. 30, 1992

Related U.S. Application Data

[63] Continuation of Ser. No. 635,659, Dec. 28, 1990, abandoned, which is a continuation of Ser. No. 544,817, Jun. 28, 1990, Pat. No. 5,010,983, which is a continuation of Ser. No. 318,081, Mar. 2, 1989, abandoned.

[30] Foreign Application Priority Data

Mar. 4, 1988 [JP] Japan .................. 63-28201
Mar. 4, 1988 [JP] Japan .................. 63-28202
Dec. 21, 1988 [JP] Japan .................. 63-165569

[51] Int. Cl.$^5$ ............................. F16D 63/00
[52] U.S. Cl. ....................... 188/77 W; 188/82.6
[58] Field of Search ............ 188/77 W, 67, 82.6; 192/8 C, 81 C; 74/531; 16/337, 342; 248/597

[56] References Cited

U.S. PATENT DOCUMENTS

| | | |
|---|---|---|
| 850,981 | 4/1907 | Tillotson . |
| 1,826,462 | 10/1931 | Dixon et al. . |
| 2,081,838 | 5/1937 | Racklyeft ............ 192/81 C |
| 2,214,487 | 9/1940 | Starkey . |
| 2,387,711 | 10/1945 | Barr . |
| 2,458,441 | 1/1949 | Starkey . |
| 2,742,126 | 4/1956 | Morton . |
| 2,815,189 | 12/1957 | Woods ............ 188/82.6 X |
| 2,881,881 | 4/1959 | Sacchini et al. . |
| 2,922,220 | 1/1960 | Sacchini . |
| 3,166,951 | 1/1965 | Castellana et al. . |
| 3,361,235 | 1/1968 | Sacchini . |
| 3,528,533 | 9/1970 | Sacchini ............ 188/77 W X |
| 3,649,988 | 3/1972 | Mellor ............ 188/67 X |
| 3,685,622 | 8/1972 | Baer et al. . |
| 3,774,571 | 11/1973 | Shimanckas . |
| 3,966,024 | 6/1976 | Baer ............ 188/826 X |
| 4,278,032 | 7/1985 | Kritske . |
| 4,353,263 | 10/1982 | Ciciora . |
| 5,024,311 | 6/1991 | Osawa ............ 182/81 C |

FOREIGN PATENT DOCUMENTS 190123 11/1982 Japan ............ 192/81 C

Primary Examiner—Robert J. Oberleitner
Assistant Examiner—Peter Poon
Attorney, Agent, or Firm—Keck, Mahin & Cate

[57] ABSTRACT

A shaft-locking device which locks rotation of a movable shaft by a clamping force of a coil spring closely surrounding a fixed shaft and a movable shaft. Both sides of the coil spring are inserted surrounding the fixed shaft and a central portion of the coil spring surrounds the movable shaft. In case of rotation of the movable shaft on both sides, the locking torque is applied. Further, the closed state of the coil spring to the movable shaft is maintained uniformly without any relation to operation by separating the end portions of the coil spring at the movable shaft side of the coil spring from an outer circumference of the movable shaft so that a constant locking torque may be always obtained.

5 Claims, 4 Drawing Sheets

FIG. 7 PRIOR ART (b)
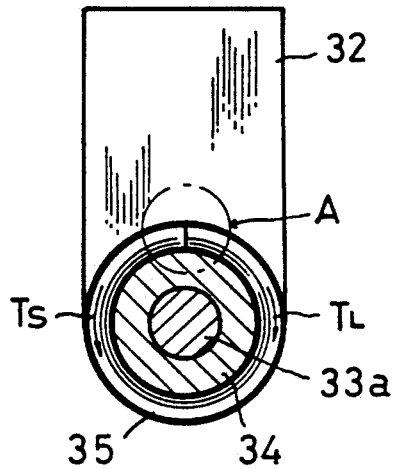
FIG. 7 PRIOR ART (a)
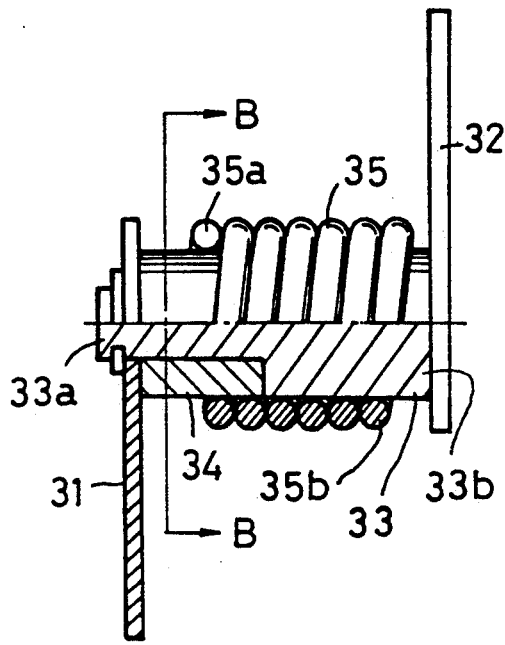
FIG. 8 PRIOR ART
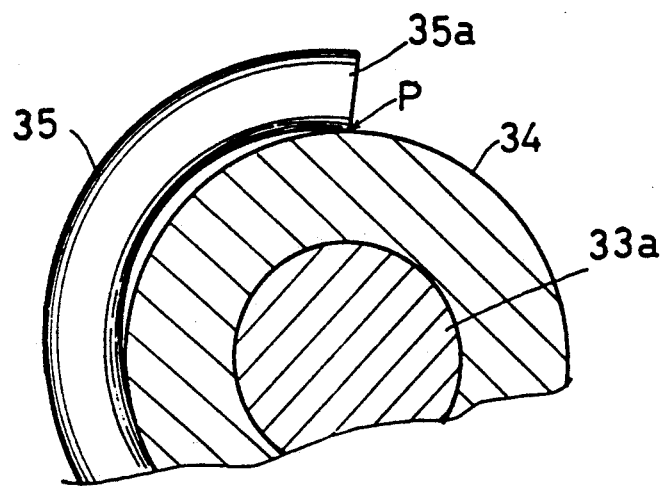

SHAFT LOCKING DEVICE

This application is a continuation of application Ser. No. 07/635,659, filed Dec. 28, 1990, now abandoned, which is a continuation of Ser. No. 07/544,817, filed Jun. 28, 1990, Ser. No. 07/318,081, filed Mar. 2, 1989, now abandoned.

BACKGROUND OF THE INVENTION

This invention relates to a device for locking rotation of a movable shaft (hereinafter referred to as "a shaft-locking device") used for adjustment of an inclined angle in various kinds of devices such as a display for a word processor or for a personal computer, a headrest of a seat, or a reclining seat, or for various kinds of lids such as for prevention of falling of a toilet lid.

The shaft-locking device is used for adjusting inclined angles in various kinds of devices, FIG. 7 shows a conventional example of a shaft-locking device. The shaft-locking device is provided with a movable bracket 31 secured to a device which requires a control of an inclined angle (not shown), a fixed bracket 32 secured to a supporting member (not shown) such as a base stand which supports the device directly or indirectly, a fixed shaft 33 integrally secured to the fixed bracket 32, and a movable shaft 34 which rotates integrally secured to the movable bracket 31. The fixed shaft 33 is a stepped shaft, with a small diameter portion 33a thereof being mounted outwardly and rotatively on the movable shaft 34. The outer diameter of a large diameter portion 33b of the fixed shaft 33 is made to be a same diameter as the outer diameter of the movable shaft 34. A coil spring 35 is inserted around the fixed shaft 33 and the movable shaft 34. The spring 35 is wound so as to be somewhat smaller than the outer diameters of 33 and 34 in a free state and closely contacts the shafts 33 and 34. In this case, both end portions 35a and 35b of the spring 35 forms free edges, the end portion 35a and 35b being inserted outwardly so that each end portion 35a and 35b may be positioned on the movable shaft 34 and on the fixed shaft 33 respectively.

In a shaft-locking device having such a construction, the movable shaft 34 is locked by a friction force of the spring 35 to hold the device at a fixed angle. The adjustment of the angle is performed by causing a slip between the spring 35 and the movable shaft 34 by adding an outer force more than the friction force, thereby rotating the movable shaft 34. Since the rotation in the direction of the arrow TL of the movable shaft 34 (rotation in the winding direction of the spring 35) is a rotative direction which shrinks the coil diameter of the spring 35, the friction force increases to form a locking torque, while the rotation in the direction of arrow Ts (rotation in the winding return direction of the spring 35) is a rotation in a direction which enlarges the diameter of the spring 35, and the friction force decreases thereby causing a slip torque. Since the locking torque is large compared with the slip torque, the device is maintained at a fixed angle by the locking torque.

In the conventional shaft-locking device, although it is possible to perform a locking against rotation in the winding direction, in the rotation in the opposite direction (winding return direction) against the winding direction, the spring 35 enlarges its diameter and the friction force decreases to lessen the locking force. Accordingly, in order to securely lock both rotations in the winding and its opposite direction, another shaft-locking device wherein the winding direction of the spring 35 is opposite is necessary. This causes a complicated construction.

Further, in the conventional shaft-locking device, the winding of the spring 35 on a movable shaft 34 is not always uniform. This is because the spring 35 is combined with the movable shaft 34 so as to have a fixed winding interference. Such tendency is most accentuated at an end portion 35a of the spring 35 on the movable shaft 34. The end portion 35a of the spring 35, as shown in FIG. 8, contacts with the peripheral surface of the movable shaft 34 at point P, but at the coil side spaced from the contact point P the spring 35 does not contact with the movable shaft 34 as a reaction of this contact. In such an outwardly extending state of the spring, the locking torque of the spring 35 cannot be constantly restrained, thereby causing an unstable locking problem.

SUMMARY OF THE INVENTION

This invention is designed to overcome the problems of such a conventional shaft locking device.

The first object of this invention is to provide a shaft-locking device which is possible to securely lock rotation in opposite directions with a single device.

Further, the second object of this invention is to provide a shaft-locking device which is possible to safely obtain locking torque of the spring.

This invention relates to a shaft-locking device which locks the rotation of a movable shaft by a clamping force of a coil spring inserted closely around a fixed shaft and a movable shaft.

Further, this invention is a shaft-locking device wherein both ends of the coil spring are inserted closely around the fixed shaft and further a central portion of the coil spring is inserted around a movable shaft whereby locking torque is adapted to occur when the movable shaft rotates in either direction.

Further, this invention relates to a shaft-locking device wherein the closely contacting state of the spring with respect to the movable shaft is always maintained irrespective of the operation and a constant locking torque is obtained by separating the end portions of the spring from the outer circumference of the movable shaft.

BRIEF DESCRIPTION OF THE DRAWINGS

In FIG. 1, (a) is a partially sectional view, and (b) is a left side view of (a).

In FIG. 2, (a) is a partially sectional view, and (b) is a left side view of (a).

In FIG. 3, (a) is a partially vertical sectional view, and (b) is a transverse cross sectional view taken along the line C-C of (a).

In FIG. 5, (a) is a transverse cross-sectional view thereof and (b) is a vertically sectional view thereof.

FIG. 7 is a conventional shaft-locking device. In FIG. 7, (a) is a partially vertical sectional view, and (b) is a sectional view taken along the line B-B of (a).

FIG. 8 is a enlarged sectional view shown by an arrow A in FIG. 7(b).

DETAILED DESCRIPTION OF THE PREFERRED EMBODIMENTS

Referring now to the embodiment of the invention shown in FIG. 1 to FIG. 6, the same elements in each example are shown with the same numerals so as to abridge double descriptions.

Figure 1:
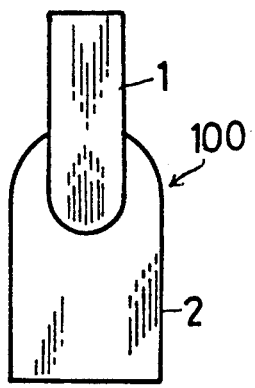
FIG. 1 is a first example of the shaft-locking device according to this invention which is capable of rotation locking in both directions of the movable shaft.
Figure 1:
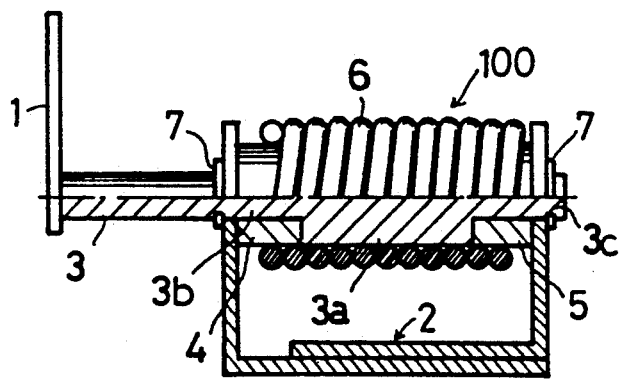
Figure 2:
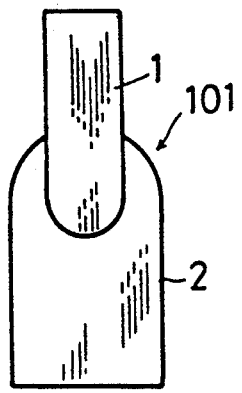
FIG. 2 is a second example of the shaft-locking device according to this invention.
Figure 2:
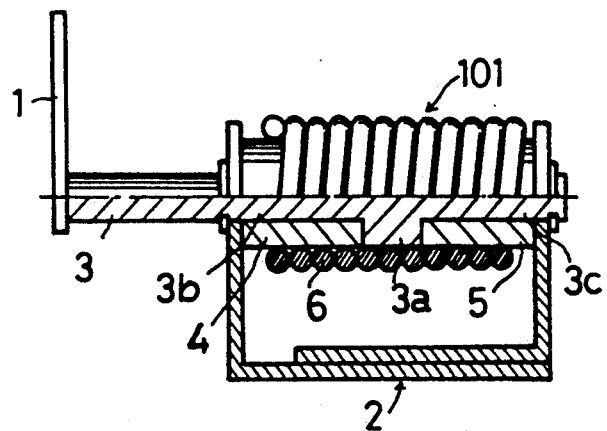

FIG. 1 and FIG. 2 illustrate the shaft-locking device 100 and 101 respectively which make possible the rotation locking of the movable shaft in both directions as an example of this invention.

The shaft-locking device 100 is provided with a movable bracket 1 secured to a device (not shown) directly or indirectly which necessitates an adjustment of an inclined angle, a fixed bracket 2 secured to a base stand which supports said device or a supporting member (not shown) of a table directly or indirectly, fixed shafts 4, 5 integrally fixed with said fixed bracket 2 and a coil spring 6 inserted around the outside of movable shaft 3 and fixed shafts 4, 5. The movable shaft 3 forms a long shaft body, wherein a portion about which the spring 6 is coiled, consists of a central portion having a large diameter portion 3a and on opposite sides thereof, small diameter portions 3b, 3c respectively. The fixed bracket 2 forms a cross-sectional shape by the connection L-type members. The fixed shafts 4, 5 being secured to opening end portions of the L-shaped members respectively. Each fixed shaft 4, 5 engages a small diameter. portion 3b, 3c of the movable shaft to rotatively support the movable shaft. The outer diameter of the fixed shafts 4, 5 being the same dimension as the large diameter 3a of the movable shaft 3. In this case, the large diameter portion 3a of the movable shaft 3 is longer in the shaft direction compared with both fixed shafts 4, 5. By this, an available number of coil winding with respect to the large diameter portion 3a of the movable shaft 3 of the coil spring are more numerous than that of the available number of coil windings about each fixed shaft 4, 5. Both ends of the coil spring 6 compose free ends. When the inner diameter of the coil is coiled about the large diameter portion 3a of the movable shaft 3 and the fixed shafts 4, 5 respectively, the coiling thereof is performed in an enlarged diameter state. After the coiling, the coil spring 6 closely contacts with the movable shaft 3 and the fixed shafts 4, 5, thereby causing a friction force between these shafts during the rotation of the movable shaft 3. Further, an E ring 7 is secured in the movable shaft 3 and is positioned at both sides of the fixed bracket 2 to prevent the sliding off of the fixed bracket 2.

In such a device having such a construction, since the available number of coils of the coil spring 6 about the movable shaft 3 is larger than that of the fixed shaft 4 (5), the friction force between the coil spring 6 and the movable shaft 3 is sufficiently large, whereby the coil spring 6 rotates with the rotation of the movable shaft 3 when the movable bracket 1 rotates. In the rotation of the movable shaft 3 and the coil spring 6, since the fixed shafts 4, 5 are provided at both sides of the movable shaft 3, the coil spring 6 decreases in diameter with respect to either one of the fixed shafts 4, 5 to cause a locking torque on one of the fixed shafts 4, 5, while its decreasing diameter causes a slip torque on the other one of the fixed shafts 4, 5.

In the illustration, a force necessary to the rotation in the T1 direction of the movable bracket 1 becomes the sum of the locking torque between the fixed shaft 4 and the coil spring 6 and the slip torque between the fixed shaft 5 and the coil spring 6, while if a force is less than the above one, the rotation in the T1 direction is locked. On the other hand, the force necessary to the rotation in the T2 direction of the movable bracket 1 becomes the sum of the locking torque between the fixed shaft 5 and the coil spring 6, and of the slip torque between the fixed shaft 4 and the coil spring 6, while if the force is less than the above one, the rotation in the T2 direction is locked. Accordingly, since the locking of the rotation in the positive and negative directions of the movable shaft 3 is possible in a single shaft-locking device, the equipment required for a shaft-locking device is limited to only one shaft-locking device and the mechanism thereof is simplified.

Therefore, angle adjustment can be performed non-stepwise by causing a slip between the fixed shafts 4, 5 and the coil spring 6 by urging an outer force more than these forces described above to the movable shaft 3.

Further, a modification of the shaft-locking device 100 will be described as follows.

A first modification thereof has a construction wherein both end portions of the coil spring 6 are separated from outer circumferences of the fixed shafts 4 and 5 respectively. By this, the top end portion of the coil spring 6 contacts with the outer circumference of the fixed shaft 4 (5) as shown in FIG. 8, which causes a coil portion to be in a non-contact state with fixed shaft 4 (5) due to the reaction of the spring, thereby being able to obtain a stable locking torque.

The embodiment construction thereof includes: A construction wherein both end portions of the coil spring 6 are separated from the outer circumference of the fixed shaft 4 (5) by extending along a tangent line direction of the outer circumference of the fixed shaft 4 (5) as in the shaft-locking device 102 described hereafter; a construction wherein both end portions of the coil spring 6 are separated from the outer circumference of the fixed shaft 4 (5) by windings of a larger diameter than other portions of the shaft-locking device 104 described hereafter; a construction wherein the fixed shafts 4,5 are provided with a stepped shaft having a small and a large diameter, both end portions of said coil spring 6 being positioned at the small diameter portions of the fixed shaft 4 (5) to separate from the outer circumferences of the fixed shafts 4 (5) of the shaft-locking device 103 described hereafter.

Further, a second modification thereof has a construction wherein grease exists between both end portions of the separated coil spring 6 and the outer circumference of the fixed shaft 4, 5 in the first modification. By having such a construction, the occurrence of rust at the separated portion of the coil spring 6 is prevented, thereby being able to obtain a stable locking torque for a long-period of use.

The embodiment construction thereof is one wherein grease is allowed to intervene in a clearance between the separated end portions of the coil spring 6 and the outer circumference of the fixed shafts 4, 5 in each construction shown in the first modification.

FIG. 2 shows another shaft-locking device 101. As shown in FIG. 2, the length in the shaft direction of the large diameter portion 3a of the movable shaft 3 is short, while the length in the shaft direction of the fixed shafts 4, 5 provided at both sides thereof is long. Accordingly, the available number of winding of the coil spring 6 on both of the fixed shafts 4, 5 is numerous as compared with that of the coil spring 6 on the movable shaft 3, whereby the friction force of the coil spring 6 between the fixed shafts 4 and 5 becomes large and the coil spring 6 is integrated with shafts 4 and 5. In this construction, the locking torque of the coil spring occurs on the movable shaft 3 even if the movable shaft 3 rotates in the T1 or the T2 direction. In other words, even if the movable bracket 1 rotates in the T1 or the T2 direction, the locking torque of the coil spring 6 occurs on the movable shaft 3, thereby being able to lock the movable bracket 1 in the positive and the negative direction.

By this, the angle adjustment of the member connected to the movable bracket 1 can be performed non-stepwise by causing a slip between the movable shaft 3 and the coil spring 6 by applying a external force greater than the locking force described above to the members.

The shaft-locking devices 100 and 101 described above, are able to lock the rotation in the positive and negative directions of the movable shaft 3, because the fixed shafts 4 and are provided at both sides of the movable shaft 3 to closely coil the coil spring 6 on the movable shaft 3 and the both of the fixed shafts 4, 5.

FIG. 3 to FIG. 6 represent shaft-locking devices 102 and 103 as examples of this invention in which it is possible to always obtain a constant locking torque.

Figure 3:
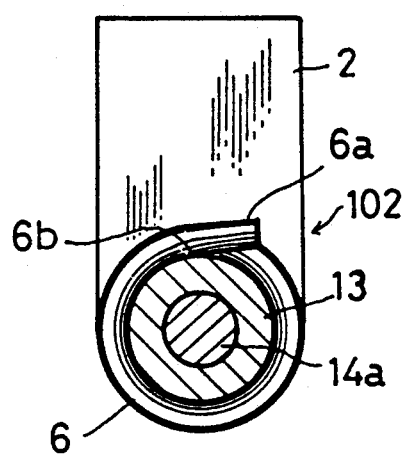
FIG. 3 is the first example of the shaft locking device according to this invention which is capable of always obtaining a constant locking torque.
Figure 3:
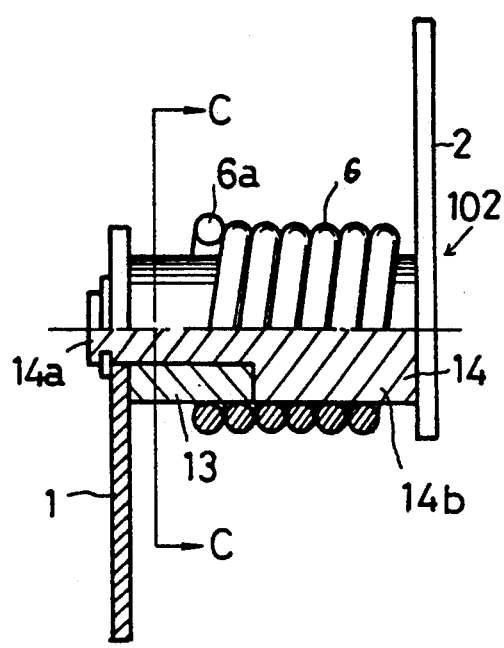

In the shaft-locking device 102 shown in FIG. 3, the movable shaft 13 contacts and rotates about fixed shaft 14, said fixed shaft 14 and said movable shaft 13 being provided with the coil spring 6 about them. The fixed bracket 2 is secured integrally to the end portion of the fixed shaft 14 as shown in FIG. 3 (a), and at the end portion of the movable shaft 13, the movable bracket 1 is secured integrally with it. The fixed shaft 14 forms a stepped shape body including a small diameter portion 14a on the left side and a large diameter portion 14b on the right side. The fixed shaft 14 rotatably engaging the movable shaft 13 at the small diameter portion 14a. The movable shaft 13 and the large diameter portion 14b of the fixed shaft 14 are formed to be the same outer diameter, and the coil spring 6 surround and bridges the movable shaft 13 and the large diameter portion 14b of the fixed shaft 14. The coil spring 6 is windingly formed in a free state so that the diameter thereof may be somewhat smaller than the outer diameter of the movable shaft 13 and of the larger diameter portion 14b of the fixed shaft 14. The spring is externally placed to closely contact with the movable shaft 13 and the fixed shaft 14. By this, the rotation of the movable shaft 13 is locked, whereby the device to which the movable bracket 1 is secured (not shown) is made to be locked at a given inclined angle.

In such a shaft-locking device 102, the end portion 6a of the coil spring 6 on the movable shaft 13 side is extended along a tangent line direction of the outer circumference of the movable shaft 13 as shown in FIG. 3(b). In other words, a contact point 6b somewhat on the coil side from the end area 6a of the coil spring 6 contacts with an outer periphery of the movable shaft 13, said end area 6a being allowed to extend in the tangent line direction from this contact point 6b. By this, the end area 6a on the movable shaft 13 side of the coil spring 6 separates the outer periphery of the movable shaft 13, whereby the end area 6a does not contact with the outer periphery of the movable shaft 13. Accordingly, other coil portions of the coil spring 6, other than the end area 6a, contact closely and uniformly with the outer periphery of the movable shaft 13, thereby being able to obtain a stable locking torque.

Figure 4:
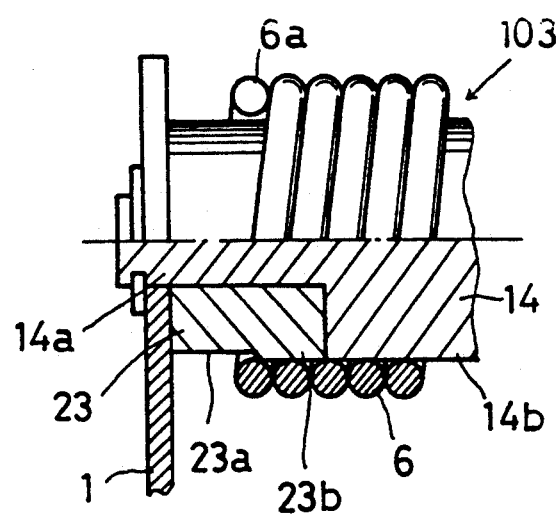
FIG. 4 is a partially vertical view of the second example of the shaft-locking device according to this invention.

FIG. 4 shows a shaft-locking device 103. Although the shaft-locking device 103 has the same fundamental construction with the shaft-locking device 102 as shown in FIG. 3, a stepped movable shaft 23 consists of a small diameter portion 23a and a large diameter portion 23b. The large diameter portion 23b of the movable shaft 23 is formed to be of a same outer diameter as the large diameter portion 14b. The large diameter portions 23b of the movable shaft 23 is formed to be of a same outer diameter as the large diameter portion 14b. The large diameter portions 23b and 14b are closely contacted by the coil spring 6. On the other hand, the coil spring 6 is inserted about the small diameter portion 23a so that the end area 6a of the coil spring 6 may be positioned, whereby the end area 6a is adapted not to closely contact the outer periphery of the small diameter portion 23a.

Accordingly, the end area 6a of the coil spring 6 and the small diameter portion 23a of the movable shaft 23 are separated without contacting each other as in the shaft-locking device 102. Other coil portions of the coil spring 6 uniformly closely contact with the large diameter portion 23b of the movable shaft 23 uniformly, thereby being able to obtain a stable locking torque by the coil spring.

Since the shaft-locking devices 102, 103 are as described above, respectively adapted to separate the end area 6a of the movable shaft sides 13(23) of the coil spring 6 surrounding the fixed shaft 14 and the movable shaft 13(23), and the outer periphery of the movable shaft 13(23) so as to not contact each other, other portions of the coil spring 6 and the movable shaft 13(23) contact closely and uniformly, thereby being able to obtain a stable locking torque of the coil spring.

Figure 5:
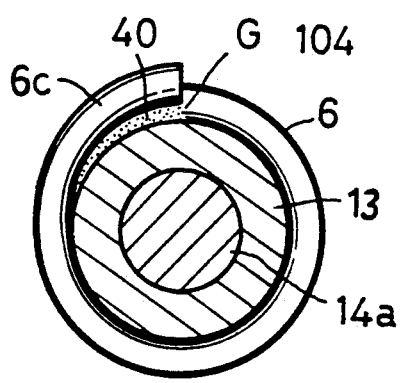
FIG. 5 is a third example of the shaft-locking device according to this invention.
Figure 5:
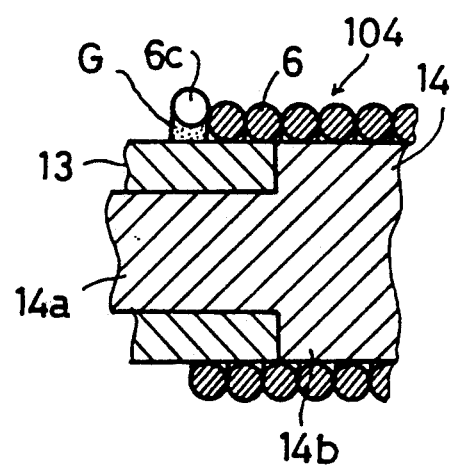
Figure 6:
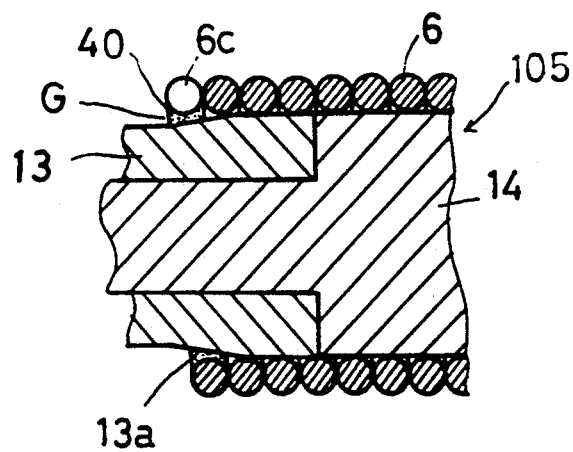
FIG. 6 is a partially vertical sectional view of a fourth example of the shaft-locking device according to this invention.

FIG. 5 and FIG. 6 present further embodiments of said shaft-locking devices 102 and 103.

In the shaft-locking device 102 (and 103), an area where the movable shaft 13 (and 23) contacts with the coil spring 6, is difficult to rust at first, while at an end area 6a of the coil spring 6 where the movable shaft 13(23), and the coil spring 6 are in a non-contact condition with each other, rust easily occurs. By this, when rust occurs over a long period or due to the environment of high temperature and high humidity, the locking torque greatly increases by this rust which disables the adjustment of the inclination by a fixed force. In the shaft locking devices 104 and 105, the pints in the shaft-locking devices 102 and 103 are altered.

The shaft-locking device 104 shown in FIG. 5, is provided with a fixed shaft having a small diameter portion 14a and a large diameter portion 14b, a movable shaft 13 contacting or surrounding a small diameter portion 14a of the fixed shaft 14 and a coil spring 6 surrounding and bridging these shafts 13, 14. The outer circumference of the large diameter portion 14b of the fixed shaft 14 and the outer circumference of the movable shaft 3 are formed to be the same surface, the coil spring 13 being windingly formed so that it may be somewhat of a smaller diameter than these diameters in a free state. Accordingly, when the coil spring 6 is inserted about the fixed shaft 14 and the movable shaft 13, a rotation locking of the movable shaft 13 is performed by the close contact of the coil spring 6 to the shafts 13 and 14. In the device 104, the end area 6c on the movable shaft 1 side of the coil spring 6 is formed to be larger than the other coil portions. In the illustration, this end area 6c is wound so that the coil diameter may gradually become larger in a free end direction. A clearance G is formed between the coil end portion 6c and the movable shaft 13, said clearance being filled with grease 40 for lubrication.

In the shaft-locking device 104 having such a construction, since the end area 6c of the coil spring 6 does not contact with the movable shaft 13, not only can a stable locking torque be obtained, but also the locking torque does not change even over a long period of use and a high humidity environment because the grease 40 in the clearance between the spring end portion 6c and the movable shaft 13 prevents the occurrence of rust.

FIG. 6 shows a shaft-locking device 105 which is another example of a shaft-locking device which prevents the occurrence of rust. In this shaft-locking device 105, a tapered surface 13a is formed on the movable shaft 13. The tapered surface is formed so that it becomes gradually smaller in diameter toward the end portion 6c of the coil spring 6. By the formation of this tapered surface 13, the clearance G is adapted to form between the spiral end portion 6c and the movable shaft even if the coil spring 6 is formed with a constant coil diameter. An the grease 40 for lubrication exists in the clearance G between the spring end portion 6c and the movable shaft 13 so that it may prevent the occurrence of rust.

As described above, in the shaft-locking devices 104, 105, the clearance G is formed between the end portion 6c of the coil spring 6 and the movable shaft 13 to prevent contact. Further, since grease 40 exists in the clearance G, not only a stable locking torque can be obtained, but also there is no occurrence of rust. Accordingly, a stable locking torque is maintained for a long period.

What we claim is:

1. A shaft-locking device for locking rotation at any arbitrary position of an article requiring control of an inclined angle, said device comprising:
   a movable bracket secured to the article requiring control of an inclined angle,
   a fixed bracket secured to a supporting member for supporting the article,
   a fixed shaft integrally secured to said fixed bracket,
   a movable shaft integrally secured to the movable bracket,
   the fixed shaft being a stepped shaft with a small diameter portion, mounted within the movable shaft, and a large diameter portion, said movable shaft having at least one large diameter portion with a diameter which is the same as the large diameter portion of the fixed shaft and being assembled so as to have the at least one large diameter portion adjacent to said large diameter portion of said fixed shaft, and
   a single continuous coil spring spiraling in a single direction surrounding the fixed shaft and the movable shaft in a closely contacted state and wound to be smaller in diameter than the large diameter portion of said fixed shaft and said movable shaft, said spring being located between said movable bracket and said fixed bracket,
   the coil spring having two end loops at opposite ends thereof, said end loops being free from connection to said movable bracket and said fixed bracket, one end loop of the coil spring located closest to said fixed bracket being continuous with a spiral of a central portion of the coil spring, the other end loop of the coil spring located closest to said movable bracket including (a) and an end portion having a clearance from an outer circumference of the movable shaft and being free always when the movable shaft is locked or rotated and (b) a contact point at which it contacts the outer circumference of the movable shaft, said coil spring closely and uniformly contacting the outer circumference of the movable shaft at all portions of said coil spring other than said end portion.

2. A shaft-locking device according to claim 1 wherein grease exists in said clearance between said end portion of the other end loop and the outer circumference of the movable shaft.

3. A shaft-locking device according to claim 2, wherein the clearance between the end portion of said other end loop and the outer circumference of the movable shaft is formed by extending said end portion along a tangent line from the movable shaft.

4. A shaft-locking device according to claim 2, wherein the clearance between the end portion of said other end loop and the outer circumference of the movable shaft is formed by winding the end portion of the other end loop to a diameter larger than the central portion of the coil spring.

5. A shaft-locking device according to claim 2, wherein the clearance between the end portion of said other end loop and the outer circumference of the movable shaft is formed by tapering a part of the outer circumference of the movable shaft.

* * * * *